Aug. 7, 1945.  R. W. BROWN  2,381,391
AVIATION CONTROL GUIDE
Filed May 14, 1943
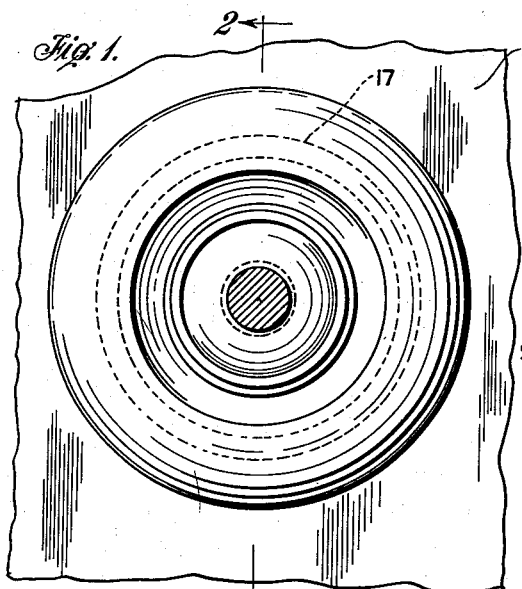
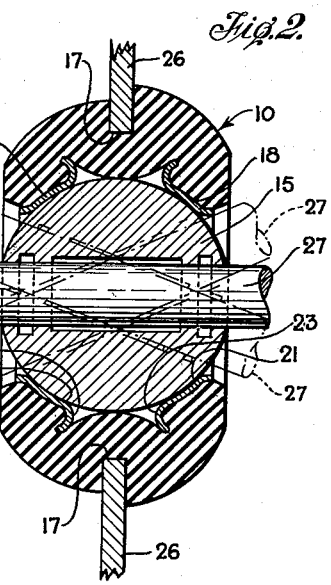
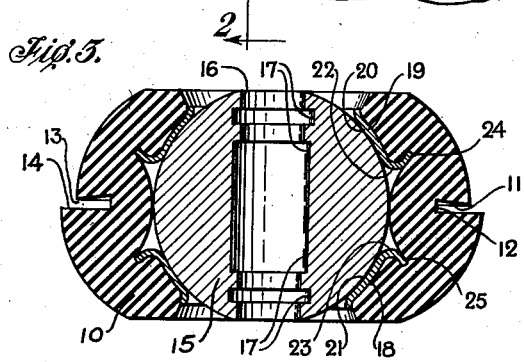
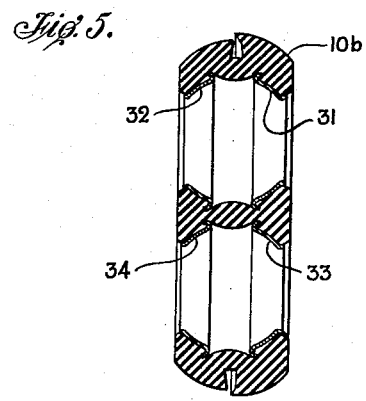
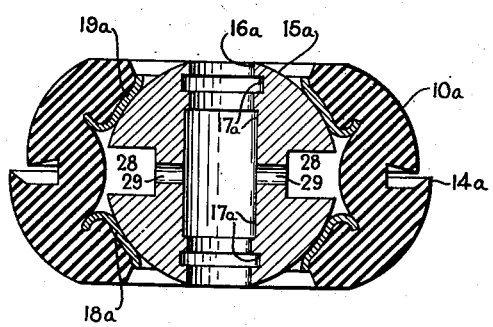
Inventor
ROY W. BROWN
By Elys Frye
Attorneys Patented Aug. 7, 1945

2,381,391

UNITED STATES PATENT OFFICE 2,381,391

AVIATION CONTROL GUIDE

Roy W. Brown, Akron, Ohio, assignor to The Firestone Tire & Rubber Company, Akron, Ohio, a corporation of Ohio Application May 14, 1943, Serial No. 487,054

2 Claims. (Cl. 308—72)

This invention relates to pressure seal control type bushing and particularly to such bushing as is adapted for use in the walls of an airplane cabin, or the like, to permit the passage of a control rod through the central hole of the bushing without appreciable leakage of air from a pressurized cabin or compartment.

The trend to high altitude flying of airplanes has emphasized the need of maintaining ground level pressure in the cabins at high altitudes. To maintain ground level pressure requires a substantially air tight cabin. A feature of airplane cabin construction which presents a problem in providing an air-tight cabin is that the reciprocating and rotating controls pass through the cabin partition. Heretofore, the openings in the cabin sides through which the controls pass permitted a rapid leakage of air from the cabin to the atmosphere when an airplane reached the rarified air of high altitudes.

An object of this invention is to provide a bushing and assembly which can be snapped into a hole in the wall of a chamber, which chamber, in service, will have a differential fluid pressure from that of the fluid pressure surrounding the chamber, said bushing being adapted to closely contact the wall of the chamber and also a control rod passing through the bushing, whereby a substantially fluid tight passageway or bearing is provided in the wall for the control rod.

Another object of this invention is to provide a bushing for the purpose stated above, the bushing being of a special form whereby a lip packing seal with the wall in which the bushing is mounted is accomplished, said special form of the bushing being such that a limited variation in the thickness of said wall will not destroy the effectiveness of the seal.

Another object of the invention is to provide a bushing assembly which will effect a substantially air tight seal of a hole in the wall of a chamber while permitting movable rods to pass through the central portion of the assembly, while permitting the rods an adjustment range through a wide variation of positions from mid position whereby the accidental limited distortion of a wall will not impair the functioning of the assembly.

Still another object of the invention is to provide a bushing of the present type wherein there is a rubber to metal contact between the nonmovable parts and a metal to metal contact between the relatively movable parts.

Yet another object of this invention is to provide non-elastic thrust bearings in a bushing of elastic material.

The foregoing and other objects, features and advantages of the invention will be readily appreciated from the following description in connection with the accompanying drawing wherein one form and two modifications of the invention have been shown by way of illustration, and wherein, Fig. 1 shows an end elevation of a bushing assembly embodying this invention having a rod extending through its central portion and the bushing attached to the edge of a hole in a fragment of a partition;

Fig. 2 is a sectional view taken on line 2—2 of Fig. 1;

Fig. 3 is a sectional view of the bushing shown in Fig. 1;

Fig. 4 is a sectional view illustrating a modification of the bushing shown in Fig. 3; and Fig. 5 is a sectional view, on a reduced scale, illustrating a bushing embodying the invention wherein the bushing has more than one hole therethrough.

Referring now particularly to Figs. 1, 2 and 3 of the drawing it will be seen that the invention in one form embodies a bushing 10 having an annular slot 11 around its periphery, said slot having substantial depth and being wider at its bottom 12 than at its mouth 13. One side of the slot is extended forming a protruding lip 14. The bushing 10 is composed of an oil resisting compound which will also resist tearing and permanent set, such as, for example, but without limitation, neoprene or Buna N, stock of 60 durometer hardness. Neoprene is a synthetic elastomer which may be considered to be essentially a polymer of 2-chloro-1, 3-butadiene or a copolymer of 2-chloro-1, 3-butadiene and another polymerizable substance.

Buna N is a synthetic elastomer which may be considered to be essentially a copolymer of butadiene and acrylonitrile. Mounted in the center of the bushing 10 is a metallic ball 15. This ball is composed of a porous bronze produced by the powdered metal process and the ball is molded to its external shape with a straight cylindrical bore 16 of correct dimensions. Undercuts 17 are cut into the sides of said bore after the metal ball has been molded. The ball is soft and is lubricated with lubricants according to the requirements of the service to which it is to be put. As will be understood by those familiar with the art, the surface of the ball when lubricated will remain oily over a long period of use. The invention contemplates a limited rotation of the ball 15 within the bushing 10 and accordingly bearings 18 and 19 are mounted within the said bushing 10. The bearings 18 and 19 are in the form of annular bands having marginal flanges. They are, in effect, spherical segments of a hollow sphere, disposed in parallel planes on opposite sides of the center of said bushing. The inside, or ball contact faces of the bearings have concave surfaces 20 and 21 that will fit flush against the surface of the ball 15. The bearings 18 and 19 terminate at their adjacent edges in hook-like outwardly turned edge portions 23 and 22 respectively. The bushing 10 is molded in the usual manner of molded rubber composition and the inside surface of the bushing conforms to the shape shown in Fig. 3. Preferably the bushing 10 is vulcanized or otherwise bonded to the bearing 19 whereas the bearing 18 is removably mounted in bushing 10.

The bushing 10, bearings 18 and 19, and ball 15 are assembled in operative relation as follows: After the said bushing has been molded over the bearing 19 is placed in position by stretching the bushing 10 over the bearing and seating the hooked portion 22 in a correspondingly shaped recess 24 formed in the bushing 10. Cement or other binders may be used between the bearing 19 and the bushing 10 to form a permanent adhesion therebetween. As indicated hereinabove the bearing 19 may be united with the bushing by vulcanization, in which case the bearing 19 would be placed in the vulcanizing mold together with the material composing the bushing. The ball 15 is next placed in position through the central opening of the bushing which is opposite the bearing 19 and the said ball is brought into contact against its bearing 19, with the axis of the cylindrical bore 16 substantially corresponding with the axis of the said bearing 19. It is to be noted that the material composing the bushing can be stretched when not restrained and accordingly the opening to the central portion of the bushing is stretched over the wide portion of the ball to permit the entrance of the ball into the bushing. After the ball is in position the bearing 18 is mounted in position with its hooked or turned-edge 23 in position in a correspondingly shaped recess 25 formed in the bushing 10. While it is desirable that bearing 19 be non-removable from the bushing 10, it will be seen that at least one of the bearings must be removable as otherwise it would be impossible to position the ball 15 within the assembly. The assembly just described is placed in operative position in a hole 17 in a wall 26 of an airplane cabin through which control rods are to pass. The bushing, of course, is of the proper size for the hole in the wall and slot 11 and is also of proper width for the thickness of the said wall. To place the assembly in operative position the assembly is pressed into the hole in said wall from the cabin side by entering the side of the bushing not carrying the lip 14 first, and then forcing said assembly through the hole 17 until the edge of the slot 11 snaps over the edge of the hole in the wall thereby causing the wall hole edge to become seated in said slot as shown in Fig. 2. A control rod 27 is passed through the cylindrical bore 16 of the ball 15, there being only sufficient clearance between the rod 27 and the sides of the bore 16 to permit reciprocating axial movement of the said rod through the said ball.

In operation the tapered sides of the slot 11 press snugly against the sides of that portion of the wall 26 which extends into the slot 11. The lip 14 also makes close contact with the wall 26 expelling the air from between the wall and said lip. Thus when the air pressure in the cabin exceeds the air pressure on the other side of the wall 26 the lip 14 is additionally pressed against the wall thereby insuring the air seal at that point. The rod 27 fits closely in the bore 16 and the leak of air through said bore is closely restricted, the labyrinths formed by the undercuts 17 making possible a closer fit to the rod than otherwise would be possible in the present assembly. The ball 15 will turn in its bearings 18 and 19, said turning being restricted only by the extended rod 27 contacting the said bearings or the sides of the bushing 10. In the present illustration the position through which the control rod passes can be adjusted universally through an angle of 25° from mid-position. This adjustment compensates for warping of the walls or for distortion of the walls resulting from strain. This compensation while limited, together with the slotted bushing, will take care of most variations of materials, workmanship, warping and considerable distortion of the walls resulting from strain. Obviously the bushing 10 could be turned approximately 25° before the rod 26 would bind in the bore 16.

The form of the invention illustrated in Fig. 4 differs from that of Figs. 1, 2, and 3 only in that a porous bronze ball 15a is substituted for the ball 15 of Fig. 3, and a bushing 10a has a lip 14a which turns over the mouth of a slot 11a substantially the width of the mouth of the slot. A groove 28 of substantial width and depth extends inwardly from the surface of and circumferentially about the ball 15a. The groove 28 is positioned at right angles with the axis of a central bore 16a of said ball and said bore 16a and groove 15a are connected by a drilled hole 29, whereby the volume of labyrinths 17a of the ball 15a are substantially added to and the weight of the ball 15a is reduced. It is to be noted that the relative position of the groove 28 to the bore 16a and to bearings 18a and 19a do not expose air which may be in said labyrinths 17a to the outside atmosphere when said ball 15a reaches its rotational limit in its said bearings. The abruptly turned up lip 14a provides a fine edge contact with the wall on which the bushing 10a may be mounted, this edge contact being backed by a sufficient volume of material in the lip to insure a very close air tight contact of the lip with the wall, said fine edge being sufficiently soft or impressionable to cover small abrupt irregularities on the surface of the wall without permitting air leaks.

In some cases it may be desirable to pass more than one control rod through a portion in close proximity to each other. The invention contemplates a bushing assembly to receive a plurality of rods. Such an assembly is illustrated in Fig. 5 wherein no new features over the form of the invention illustrated in Figs. 1, 2, and 3 are disclosed except that in Fig. 5 a bushing 10b is oblong in longitudinal section in order to provide sufficient area to accommodate two control rods. Structurally the assembly of Fig. 5 may use any of the features disclosed herein above and a detailed construction of these features is omitted for the sake of brevity. In this form of the invention the ball sockets are provided with bearings 31, 32, 33, and 34 in the same manner and for the same purpose as the bearings 18 and 19 are used. Those familiar with the art will readily understand these modifications of the invention, and that similarly modifications may be made to accommodate more than two control rods.

It will now be seen that applicant has produced a pressure seal control type bushing assembly which provides means constituting outlet ports for control rods from an airplane cabin which means is easily installed, substantially prevents air leaks through said ports while permitting unrestricted longitudinal or rotating motion of the control rods, said means being adapted to fit on irregular surfaces and walls of different thicknesses, and before or after insulation to adjust itself to warped or distorted walls without losing its air sealing efficiency.

Obviously the assembly is susceptible to modifications and changes by those familiar with the art without departing from the spirit of the invention, and it is, therefore, to be limited only by the prior art and the scope of the appended claims.

I claim:

1. In a bushing assembly of the class described, the combination of an outer member composed of an oil resisting synthetic elastomer; an inner ball member composed of porous bronze; and a pair of cooperating metallic bearings intermediate said outer and inner members; said outer member having attachment means formed in its outer edge whereby said outer member is adapted to be mounted in a wall of an airplane which separates differential fluid pressures, said bearings being in the form of annular bands having hook-like portions adapted to hook into recesses formed in the inner wall of said outer member, said bearings having a concave surface corresponding to the surface of said ball, said ball having a central bore therethrough, said inner member being adapted to receive in close slidable relation a control rod projected through said central bore, said inner member being capable of rotating on said bearings through an angle of approximately 25° from mid-position while said outer member remains stationary.

2. A bushing comprising a flexible outer portion adapted to be mounted in a stationary position in a partition of an airplane, a rigid central portion in the form of a ball, said central portion being supported by said outer portion, a pair of cooperating metallic bearings mounted on said outer portion intermediate said outer and central portion, said central portion having a central bore therethrough adapted to receive in slidable relation a guide rod, said bearings permitting a limited rotation of said central portion thereon whereby the ball adjusts its position relative to the said outer portion to compensate for imperfect workmanship, variations in material and distortion of said partition.

ROY W. BROWN.